July 5, 1938.   B. J. HUNTSMAN   2,122,525
APPARATUS FOR MANUFACTURING METAL CLOSURES
Filed May 20, 1936
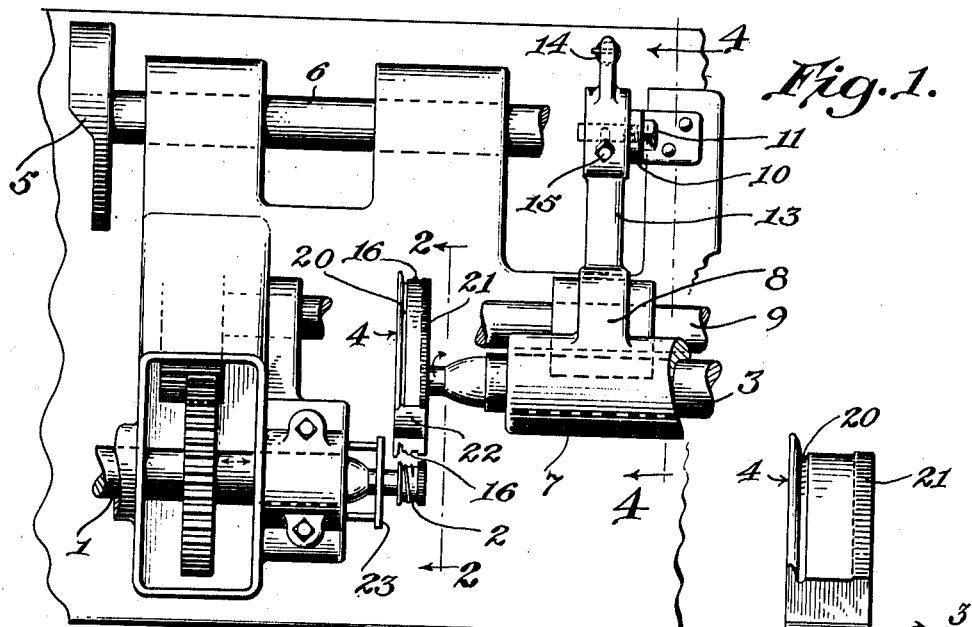
Fig. 1.
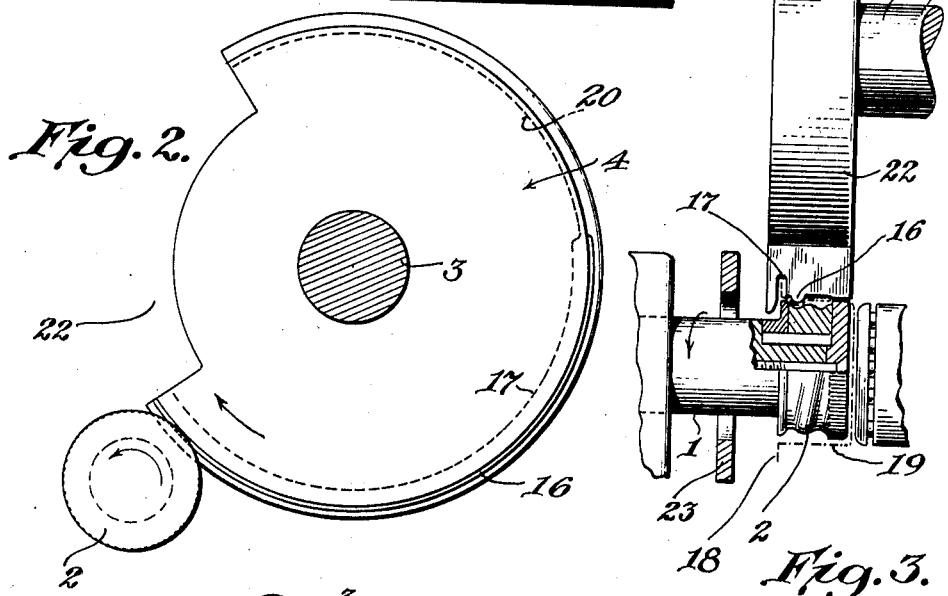
Fig. 2.
Fig. 3.
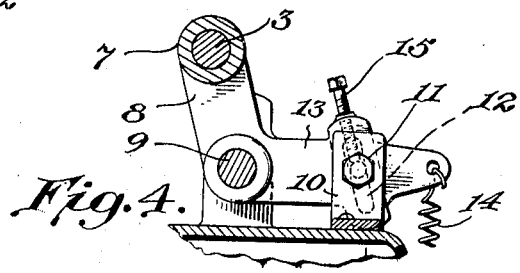
Fig. 4.
INVENTOR
Bert J. Huntsman
ATTORNEYS Patented July 5, 1938

2,122,525

UNITED STATES PATENT OFFICE 2,122,525

APPARATUS FOR MANUFACTURING METAL CLOSURES

Bert J. Huntsman, Wheeling, W. Va., assignor to Hazel-Atlas Glass Company, Wheeling, W. Va., a corporation of West Virginia Application May 20, 1936, Serial No. 80,855

3 Claims. (Cl. 153—7)

The invention relates to a machine for manufacturing metal closures, particularly closures of the screw thread type.

It has been the common practice to manufacture closures of this type by male and female threading chucks, of substantially the same diameter, mounted on horizontal spindles. In such machines the blank is placed on the male chuck and then one of the spindles with its chuck is moved laterally to bring the two chucks into cooperative relation. Then after the closure has been formed one of the chucks is moved laterally to permit removal of the closure.

In my Patent No. 2,045,602, granted June 30, 1936, there is disclosed an improvement on the old apparatus described above. In accordance with the invention of said application the female chuck is of considerably greater diameter than that of the male chuck, and by such a construction the threading and curling operations can be performed consecutively instead of simultaneously, thereby permitting the rolling of deep threads, as is clearly described in said application. But in such machine, as well as in the old machines in which the chucks of both spindles were of substantially the same diameter, there was necessarily a relative lateral movement between the two chucks for every closure manufactured. Such lateral movement not only necessarily slowed down the operation, but also the closures were frequently deformed to some extent due to the hammer blow resulting from the sudden coming together of the two chucks.

From the foregoing it will be understood that one of the objects of the present invention is to increase the rate of production, particularly in machines of the type disclosed in my above-mentioned patent, by eliminating the relative lateral movement of the chucks; and that another object of the invention is to produce better closures at this increased rate of production, by eliminating the hammer blow effect which often results in the closures being out of round.

Various other objects and advantages of the invention will be apparent to those skilled in the art from the following detailed description, when taken in connection with the accompanying drawing, in which, Figure 1 is a plan view of the machine, with various parts omitted which are old and well known in the art.

Figure 2 is a vertical transverse sectional view taken on line 2—2 of Figure 1.

Figure 3 is a side view of the male and female rings, in cooperative relation, with certain parts being shown in section; and Figure 4 is a detail sectional view taken on line 4—4 of Figure 1.

Referring to the drawing in more detail, numeral 1 indicates the shaft or spindle which carries the male chuck 2, and numeral 3 indicates the shaft or spindle which carries the female chuck 4.

The spindle 1 for the male chuck is mounted in a fixed bearing so that it has no lateral movement, but this shaft is reciprocated longitudinally at timed intervals as by means of a cam 5 secured to a shaft 6. It is unnecessary to illustrate the connections between the cam 5 and the shaft 1 for reciprocating this shaft. Numeral 2' refers to a conventional backing disk for holding the cap blanks on the male chuck.

The spindle 3 for the female chuck is mounted in a housing 7. Formerly this housing and spindle were periodically oscillated laterally to move the female chuck toward and from the male chuck; a cam being provided for that purpose. But in accordance with the present invention the female chuck remains in a fixed position, without any oscillatory movement, though means are preferably provided by which the spindle and housing can be adjusted.

Merely for the purpose of adjusting this spindle 3 its housing is in the specific embodiment illustrated, carried by an arm 8 pivotally mounted at 9. Numeral 10 refers to a bracket fixed to the base plate of the machine. This bracket carries a bolt 11 which projects into a slot 12 provided in a lateral extension 13 of the arm 8. By means of a coil spring 14 attached to the lateral extension, and a screw 15 threaded through the extension and engaging the bolt 11, it is possible to laterally adjust the housing 7 and its spindle 3.

The spindles 1 and 3, and the shaft 6, are all geared together and driven from a common source, but as the driving mechanism is old and well known it need not be illustrated. Of course the gear ratio between the two chucks is such that they will have the same peripheral speed; and as will appear hereinafter the spindle 3 makes two revolutions for each revolution of the cam shaft 6.

In accordance with the present invention the threading and curling operations are performed consecutively, as described in my above-mentioned Patent No. 2,045,602, and either the threading operation or the curling operation may be performed first. The female chuck is therefore of much greater diameter than the male chuck; the ratio in this particular embodiment being about three and one-half to one.

The thread 16 of the female chuck extends a sufficient distance about the female chuck to cause the formation of the usual overlapping thread. And it will be noted that where the thread is present on the female chuck the curling ring is provided with a deep groove 17, to receive the flange 18 of the hat-shaped blank 19. Thus during the threading operation the flange of the blank is free, thereby permitting deep threads to be rolled without any straining or breaking of the metal. When the thread has been rolled the curling groove 20 engages the flange 18 and curls the flange into the usual bead or wire edge. This curling groove 20 is of course of sufficient length to cause the flange to be curled entirely around the cap. The knurling ring is indicated by numeral 21, and the knurls preferably extend entirely around the circumference, as the knurling operation does not interfere in any way with the threading and curling operations.

The construction of the female chuck, as thus far described, is the same as that disclosed in my above-mentioned Patent No. 2,045,602 and hence it is unnecessary to give a more detailed description of the construction of the curling ring and threading ring on the female chuck, or further describe how such construction facilitates the rolling of deep threads. But in my said prior application it was necessary that there be a lateral movement of one of the chucks every time a cap was manufactured, to permit removal of the completed cap, for the thread and the curling groove, taken together, extended entirely around the female chuck.

As previously mentioned the present invention avoids the necessity of laterally moving one of the chucks. I accomplish this by making the female chuck of such diameter that the thread and the curling groove, taken together, do not extend entirely around the chuck, and that portion of the chuck which carries neither the thread nor the curling groove, is cut away as indicated by numeral 22.

By means of this construction it is apparent that in the continuous rotation of the two chucks, the thread of the female chuck will engage the blank 19 and roll the thread, then the curling groove 20 will engage the blank flange 18 and curl the bead. When this is completed the cut-away portion 22 reaches the male die, and therefore the completed cap can be removed without any lateral movement of either of the chucks. While I have described the curling as following the threading, yet it is apparent that the order can be reversed, if desired.

When the cut-away portion 22 reaches the male chuck, the finished cap can be removed in any manner desired, but I prefer to remove it by reciprocating the shaft 1 which carries the male chuck. This is accomplished by the cam 5, and when the shaft 1 is moved to the left (Fig. 1) the finished cap engages a stripper plate 23 which ejects the cap from the male chuck.

The two chucks continue their rotation, and when the cut out portion 22 of the female chuck again reaches the male chuck a blank is fed into the space, by mechanism not shown, and the shaft 1 now moves to the right (Fig. 1) under the influence of cam 5, so that the parts are in position to thread, curl and knurl another cap. As stated hereinbefore the female chuck makes two revolutions for each revolution of the cam shaft 6 and its cam 5, as the female chuck requires a complete revolution to make a cap, and then another complete revolution while the completed cap is being removed and a new blank inserted. During these two revolutions of the female chuck, a single revolution of the cam causes the shaft 1 carrying the male chuck, to be drawn back for removal of the completed cap and then advanced to receive a new blank.

Thus it is apparent that in the operation of the apparatus herein disclosed there is no lateral movement of one of the chucks, as in the prior practice, and that the rate of production is thereby greatly increased. Further, in the prior practice the caps were often out of round, due to the hammer blow effect of bringing the two chucks together. Obviously this undesirable effect of the prior machines is entirely eliminated by the present invention.

While I have described the preferred apparatus in considerable detail, yet it will be understood that various changes and modifications may be made without departing from the spirit of the invention, and all such changes and modifications are intended to be included within the scope of the appended claims.

What I claim is:

1. A machine for threading and beading metal caps, including male and female chucks rotatable in opposite directions, both of said chucks having stationary axes, the female chuck being of greater diameter than the male chuck and having a threading portion and a curling portion, said female chuck having a peripheral cut-away portion, and means for moving the male chuck lengthwise to eject a cap.

2. A machine for threading and beading metal caps, including male and female chucks rotatable in opposite directions, both of said chucks having stationary axes, threading and curling means carried by the chucks, the female chuck having a peripheral cut-away portion, and means for moving the male chuck lengthwise to eject a cap.

3. A machine for threading and beading metal caps, including male and female rotatable chucks, both of said chucks having stationary axes, threading and curling means carried by the chucks, the female chuck having a peripheral cut-away portion, a stripper plate in cooperative relation with the male chuck, and means for relatively moving the male chuck and stripper plate to eject a cap.

BERT J. HUNTSMAN.